United States Patent
Pan

(10) Patent No.: US 9,903,752 B2
(45) Date of Patent: Feb. 27, 2018

(54) SCALE WITH DETACHABLE PROTECTIVE COVER

(71) Applicant: X.J. ELECTRICS(HUBEI) CO., LTD., Hubei (CN)

(72) Inventor: Yun Pan, Jiangsu (CN)

(73) Assignee: X.J. Electrics (HUBEI) Co., Ltd., Hubei (CN)

( * ) Notice: Subject to any disclaimer, the term of this patent is extended or adjusted under 35 U.S.C. 154(b) by 225 days.

(21) Appl. No.: 14/758,824

(22) PCT Filed: Nov. 21, 2014

(86) PCT No.: PCT/CN2014/091889
§ 371 (c)(1),
(2) Date: Jul. 1, 2015

(87) PCT Pub. No.: WO2016/078076
PCT Pub. Date: May 26, 2016

(65) Prior Publication Data
US 2017/0108371 A1    Apr. 20, 2017

(51) Int. Cl.
*G01G 21/28* (2006.01)
*G01G 21/22* (2006.01)

(52) U.S. Cl.
CPC ............. *G01G 21/28* (2013.01); *G01G 21/22* (2013.01)

(58) Field of Classification Search
CPC ......... G01G 21/22; G01G 21/28; G01G 21/30
See application file for complete search history.

(56) References Cited

U.S. PATENT DOCUMENTS

| 3,811,523 A * | 5/1974 | Artwick ................. G01G 21/28 177/180 |
| 3,968,849 A * | 7/1976 | Dale ...................... G01G 21/28 177/127 |
| 4,862,978 A | 9/1989 | Borchard |
| 5,044,453 A * | 9/1991 | Bankier ................. G01G 19/41 177/25.16 |
| 5,046,322 A | 9/1991 | Bulla et al. |
| 6,509,534 B1 * | 1/2003 | Thadani ................. G01G 21/28 177/126 |

(Continued)

FOREIGN PATENT DOCUMENTS

| CN | 2546863 | 4/2003 |
| CN | 101645975 | 2/2010 |

(Continued)

OTHER PUBLICATIONS

Machine translation of CN 201414152.*
International Search Report filed in PCT/CN2014/091889.

*Primary Examiner* — Natalie Huls
(74) *Attorney, Agent, or Firm* — Rankin, Hill & Clark LLP

(57) ABSTRACT

A scale includes a display apparatus, a weighing apparatus on which a scale pan assembly and a weight sensor are disposed, and a control apparatus that connects to the weighing apparatus; further including a lower cover and an upper cover that is buckled upside-down on and movably connected to the lower cover; and the display apparatus, the weighing apparatus, and the control apparatus are all disposed in a cavity formed by the upper cover and the lower cover. A groove-shaped protective cover is detachably connected to an interior side of the upper cover.

17 Claims, 5 Drawing Sheets

(56) References Cited

U.S. PATENT DOCUMENTS

| | | | | |
|---|---|---|---|---|
| 7,193,163 | B1* | 3/2007 | Kesselman | G01G 21/22 |
| | | | | 177/177 |
| D682,129 | S * | 5/2013 | Kesselman | D10/91 |
| 8,796,565 | B2* | 8/2014 | Lauer | G01G 21/28 |
| | | | | 177/243 |
| 2002/0195281 | A1* | 12/2002 | Zahriya | G01G 7/06 |
| | | | | 177/127 |
| 2004/0035614 | A1* | 2/2004 | Zhang | G01G 21/22 |
| | | | | 177/180 |
| 2006/0054335 | A1* | 3/2006 | Rapp | G01G 21/283 |
| | | | | 174/481 |
| 2008/0271929 | A1* | 11/2008 | Whitney | G01G 21/283 |
| | | | | 177/25.12 |
| 2009/0205877 | A1* | 8/2009 | Claypool | G01G 21/22 |
| | | | | 177/239 |
| 2009/0294184 | A1* | 12/2009 | Gerster | G01G 19/445 |
| | | | | 177/126 |
| 2012/0222905 | A1* | 9/2012 | Huang | G01G 19/52 |
| | | | | 177/210 R |
| 2016/0334266 | A1* | 11/2016 | Thirouin | G01G 21/28 |
| 2017/0074719 | A1* | 3/2017 | Izumo | G01G 23/00 |

FOREIGN PATENT DOCUMENTS

| | | |
|---|---|---|
| CN | 201414152 | 2/2010 |
| CN | 202018330 | 10/2011 |
| CN | 103353337 | 10/2013 |
| JP | 9-79896 | 3/1997 |

* cited by examiner

SCALE WITH DETACHABLE PROTECTIVE COVER

TECHNICAL FIELD

The present invention belongs to the technical field of living appliances and relates to a scale, and in particular to a portable card-type scale.

BACKGROUND

A scale is a common apparatus for measuring weight of an object in daily life. With continuous development of scales and to meet different demands on different occasions, scales with multiple forms of structures have been developed, such as a steelyard, a platform scale, a counter scale, and an electronic scale. As an automated weighing device that weighs an object, the electronic scale is widely applied on various occasions such as production and family occasions due to advantages that the electronic scale is quick, accurate, automatic, and so on.

A working principle of a common electronic scale is as follows: When an object is placed on a scale pan assembly, gravity of the object is imposed on a weight sensor, the sensor is deformed, so that the impedance changes. At the same time, an excitation voltage changes, along which a changed analog signal is output. The signal is output to a corresponding control unit after certain conversion. Then, the control unit outputs a weight result to a display apparatus according to a keyboard command and a program command, so that people can intuitively obtain weight data directly from the display apparatus.

However, the common electronic scale is not convenient to carry. Hence, a card-type scale that is convenient for people to carry emerges at the right moment. However, the use scope of the card-type scale on the current market is relatively narrow and the card-type scale is usually pressed by uncontrollable external force in a carrying process. Consequently, precision of the card-type scale deviates relatively greatly after a long-time service; therefore weighing precision is affected.

SUMMARY

An objective of the present invention is to provide a scale to cope with a technical problem that the use scope of the current card-type scale is relatively small and precision of the card-type scale deviates relatively greatly after a long time service, thereby affecting weighing precision.

To solve the foregoing technical problem, the following technical solution is adopted in the present invention: a scale is provided, where the scale includes a display apparatus, a weighing apparatus which comprises a scale pan assembly and a weight sensor, and a control apparatus that connects to the weighing apparatus and is used to control the display apparatus to display weight data corresponding to an object;

the scale further includes an upper cover and a lower cover (per the orientation shown in FIG. 1), where the upper cover is buckled on the lower cover and movably connected to the lower cover; and the display apparatus, the weighing apparatus, and the control apparatus are all disposed in a cavity formed by the upper cover and the lower cover; and a concave protective cover is detachably connected to an interior side of the upper cover.

Further, a mounting hole is arranged on a top of the upper cover, and the protective cover is placed inside the mounting hole.

Further, multiple raised bars are disposed on the interior side of the upper cover, where the raised bars are arranged around the mounting hole, multiple flanks are disposed outwards from edges of side walls of the protective cover that are away from the top of the protective cover, and the flanks abut against the top of the corresponding raised bars.

Further, a fastening hole is arranged on each of the raised bars, multiple bulges are disposed on an exterior side of the side walls of the protective cover, and the bulges are fastened into the fastening holes.

Further, the scale further includes a middle cover, the middle cover is disposed in the cavity formed by the upper cover and the lower cover, the scale pan assembly is located above the middle cover, and a control panel of the display apparatus is disposed on the middle cover.

Further, multiple buttons are disposed on and protrude from the middle cover and the buttons are connected to the weight sensor by using the control apparatus.

Further, the scale pan assembly includes a first scale pan and a second scale pan, the second scale pan mutually fits the first scale pan to protect the first scale pan, and the first scale pan is in contact with the weight sensor.

Further, the upper cover and the lower cover are movably connected using a pin.

Further, the upper cover and the lower cover are locked up by using a self-locking switch.

Further, the protective cover is made of a transparent material.

Compared with the prior art, a scale in the present invention provides the following beneficial effects:

(1). A concave protective cover is detachably connected to an interior side of an upper cover, where the upper cover and a lower cover are movably connected (for example, connected using a pin), and when not in use, the upper cover and the lower cover are mutually buckled and the protective cover is buckled on a scale pan assembly to prevent the scale pan assembly from extrusion and abrasion, thereby better protecting the scale pan assembly, so that the scale is sturdy, durable, and easy to carry, and weighing precision of the scale after a long time service is ensured; and when in use, if the protective cover is removed above from the upper cover after the upper cover is arranged, the protective cover can be placed, with an opening end turning upward, on the scale pan assembly to function as a scale pan, and because the protective cover is a trough body and side walls are provided all around a periphery of a top thereof, the protective cover can be and is convenient to be used to hold a powder-like, fine sand-size, or granular object, and apparently, the scope of objects that can be weighed by the scale is expanded to some extent;

(2) The upper cover and the lower cover are movably connected (for example, connected using a pin) and the upper cover and the lower cover are locked up by using a self-locking switch; therefore, when not in use, the scale is in box structure or in a card-like structure, can be pocketed, and is easy to carry; and (3) The scale has complete functions and an elegant appearance and is easy to operate, convenient to use, and durable in use.

Figure 1:
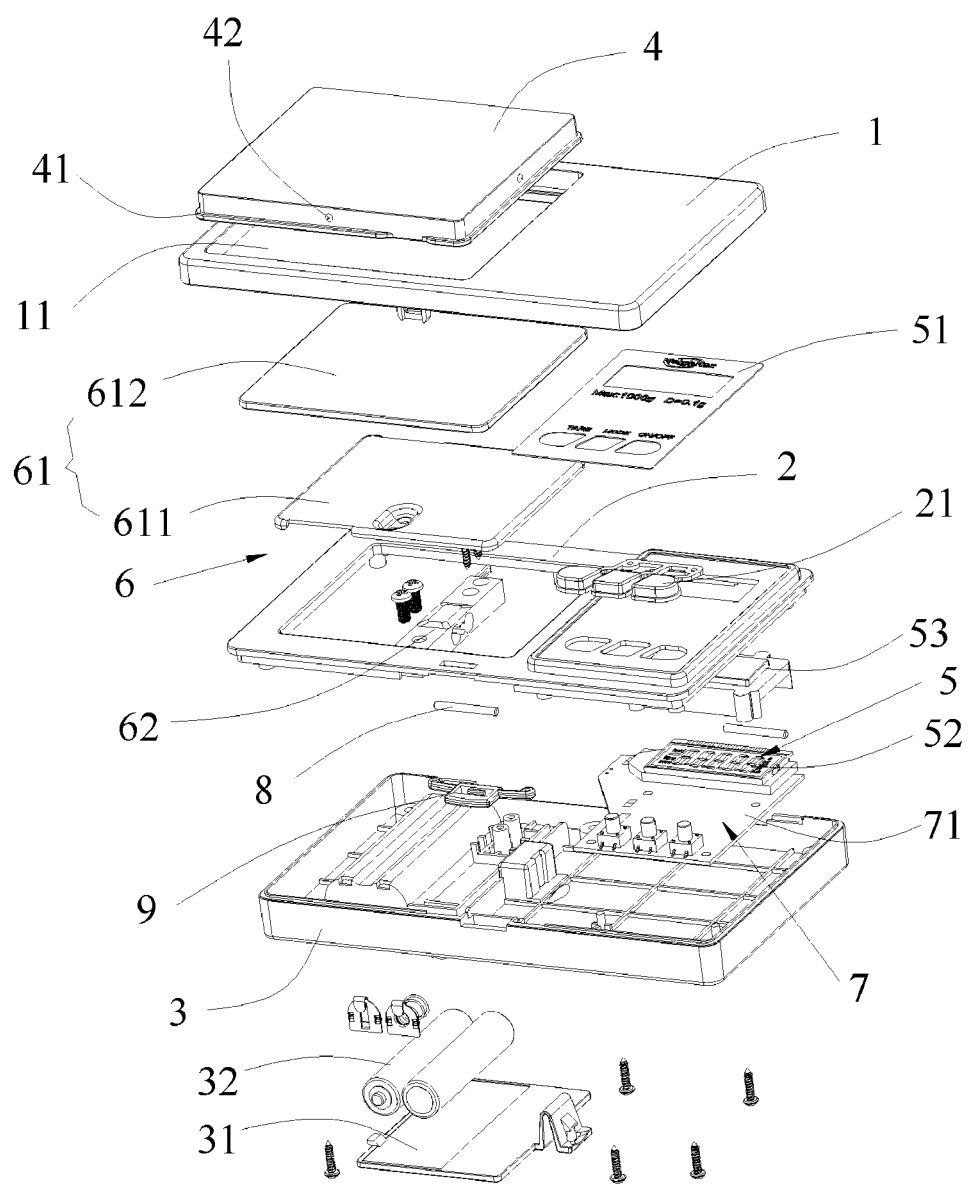
FIG. 1 is a schematic three-dimensional exploded diagram of a scale according to an embodiment of the present invention.

Reference signs in the drawings are as follows:

1: Upper cover; 11: Mounting hole; 12: Raised bar; 121: Fastening hole; 2: Middle cover; 21: Button; 3: Lower cover; 31: Battery cover, 32: Battery;

4: Protective cover; 41: Flank; 42: Bulge; 5: Display apparatus; 51: Control panel; 52: Display panel; 53: Protective housing;

6: Weighing apparatus; 61: Scale pan assembly; 611: First scale pan; 612: Second scale pan; 62: Weight sensor; and 7: Control apparatus; 71: PCB board; 8: Pin, 9: Self-locking switch.

DESCRIPTION OF EMBODIMENTS

To make the technical problem to be solved, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

The following describes implementation of the present invention in detail with reference to specific accompanying drawings.

FIG. 1 to FIG. 8 show a scale provided in an exemplary embodiment of the present invention.

As shown in FIG. 1, the scale includes a display apparatus 5, a weighing apparatus 6 which comprises a scale pan assembly 61 and a weight sensor 62, and a control apparatus 7 that connects to the weighing apparatus 6, where the display apparatus 5 is mainly configured to display weight data of a weighed object, the scale pan assembly 61 is mainly configured to hold the weighed object, the weight sensor 62 is mainly configured to sense a weight of the weighed object and transfer a signal about the weight to a control apparatus 7, and the control apparatus 7 is mainly configured to control the display apparatus 5 to display the weight data corresponding to the object, turn on or off the power, reset metering to zero, and switch between modes of units of measurements, and so on.

Figure 2:
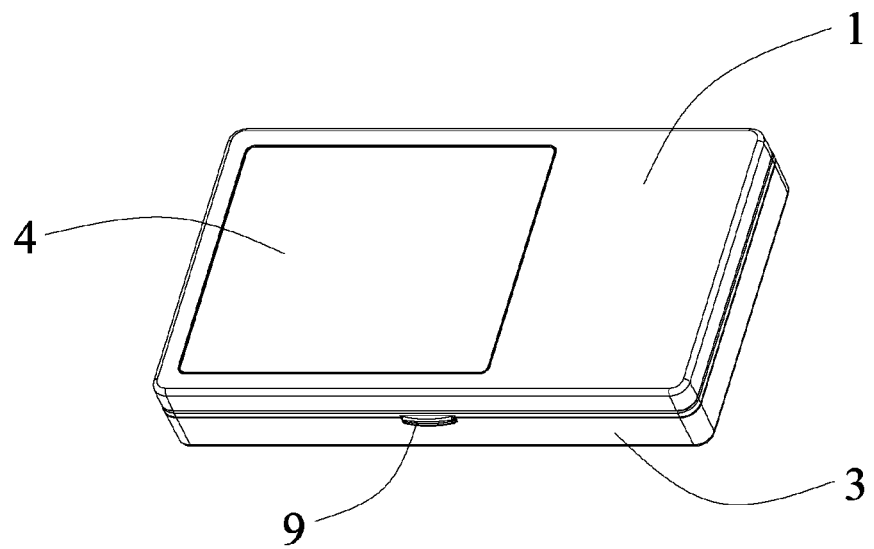
FIG. 2 is a schematic three-dimensional diagram of a scale according to an embodiment of the present invention.
Figure 3:
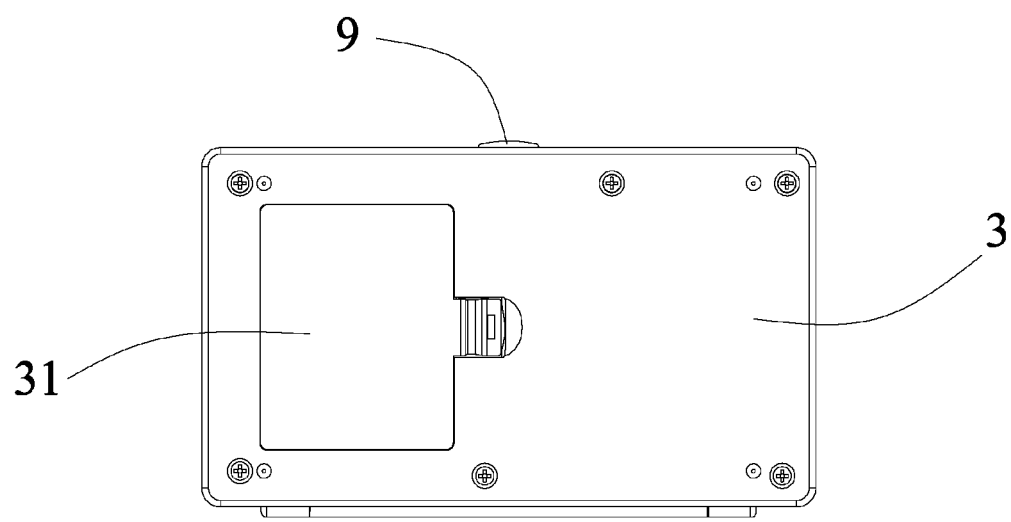
FIG. 3 is a bottom view of a scale according to an embodiment of the present invention.
Figure 4:
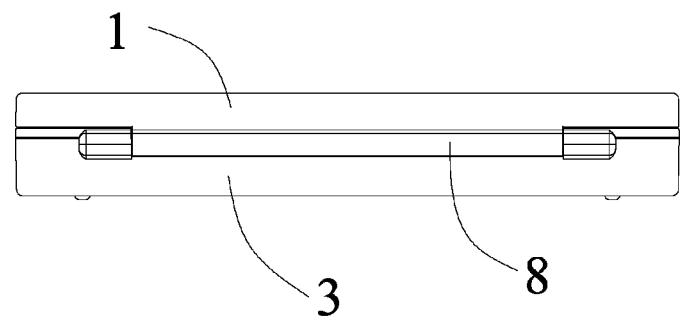
FIG. 4 is a rear view of a scale according to an embodiment of the present invention.

As shown in FIG. 1 to FIG. 8, for ease of carrying, the scale further includes an upper cover 1 and a lower cover 3, where, as shown in FIG. 2 and FIG. 4, when not in use, the upper cover 1 is buckled on the lower cover 3 to form a box structure or form a card-shaped structure. In this way, a user can pocket the scale and carry the scale with the user. In addition, as shown in FIG. 2 and FIG. 4, the upper cover 1 and the lower cover 3 are exactly mutually buckled, that is, the upper cover 1 fits the lower cover 3 in both shape and size. To make it easy for a user, the upper cover 1 is movably connected to the lower cover 3, that is, after the upper cover 1 is open, the upper cover 1 is still connected to the lower cover 3, and this can reduce possibility of loss of the upper cover 1.

As shown in FIG. 1 to FIG. 5, to minimize space occupied by the scale, the display apparatus 5, the weighing apparatus 6, and the control apparatus 7 are all disposed in a cavity formed by the upper cover 1 and the lower cover 3, where the display apparatus 5, the weighing apparatus 6, and the control apparatus 7 are mainly arranged in a cavity formed by the lower cover 3.

As shown in FIG. 1 to FIG. 8, for ease of protection of the scale, and to be precise, for better protection of the scale pan assembly 61 of the scale from extrusion and abrasion, the scale further includes a concave protective cover 4, where the protective cover 4 is disposed on an interior side of the upper cover 1 and is detachably connected to the upper cover 1. When the protective cover 4 is disposed on the interior side of the upper cover 1, the protective cover 4 is buckled on the scale pan assembly 61 to protect the scale pan assembly 61, so that measurement precision of the scale basically remains unchanged after the scale is used for a long time and therefore quality of the scale is improved.

Alternatively, after the protective cover 4 is removed from the upper cover 1 and the protective cover 4 is placed on the scale pan assembly 61, the protective cover 4 may function as the scale pan assembly 61 to hold an object. Because the protective cover 4 is concave, if opening ends of the protective cover 4 is turned upward to hold the object, the protective cover 4 can be used to hold a powder-like, fine sand-size, or granular object. Apparently, the scope of objects that can be weighed by the scale is expanded to some extent, that is, the use scope of the scale is expanded.

Further, in an exemplary embodiment provided in the present invention, as shown in FIG. 1, FIG. 2, FIG. 5, and FIG. 6, to minimize occupation space, a mounting hole 11 is arranged on a top of the upper cover 1 of the scale, and the protective cover 4 is placed inside the mounting hole 11, so that the protective cover 4 fully fits into the interior side of the upper cover 1. It should be noted that, preferably, when the protective cover 4 is arranged on the top of the upper cover 1, a top of the protective cover 4 is exactly flush with a cover surface of the upper cover 1 and the protective cover 4 exactly fits the mounting hole 11, that is, the top of the protective cover 4 keeps consistent with the mounting hole 11 in shape and size.

Figure 5:
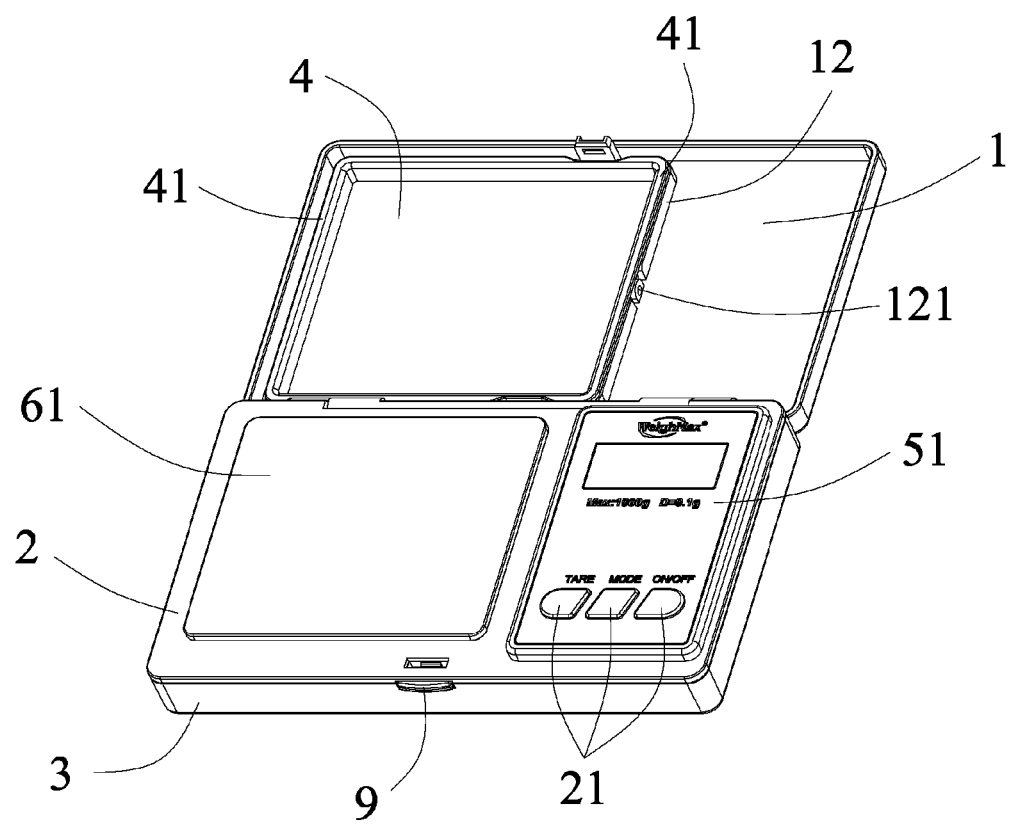
FIG. 5 is a schematic three-dimensional structural diagram of a scale according to an embodiment of the present invention, where an upper cover of the scale is open.
Figure 6:
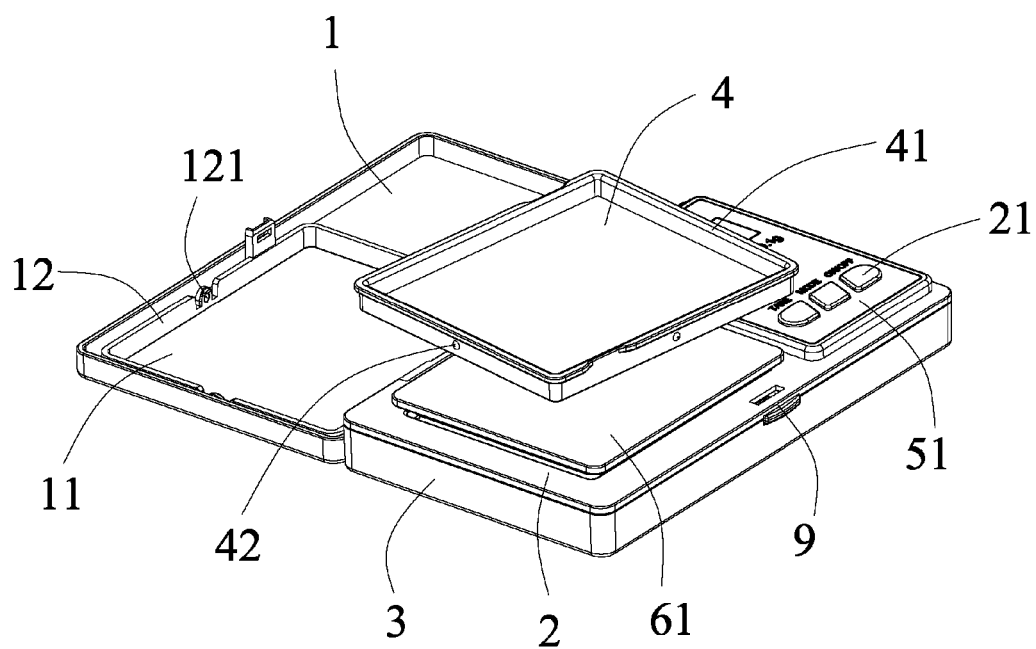
FIG. 6 is a schematic three-dimensional structural diagram of a scale according to an embodiment of the present invention, where an upper cover of the scale is open, a protective cover is taken off, and the protective cover is placed on a scale pan assembly.
Figure 7:
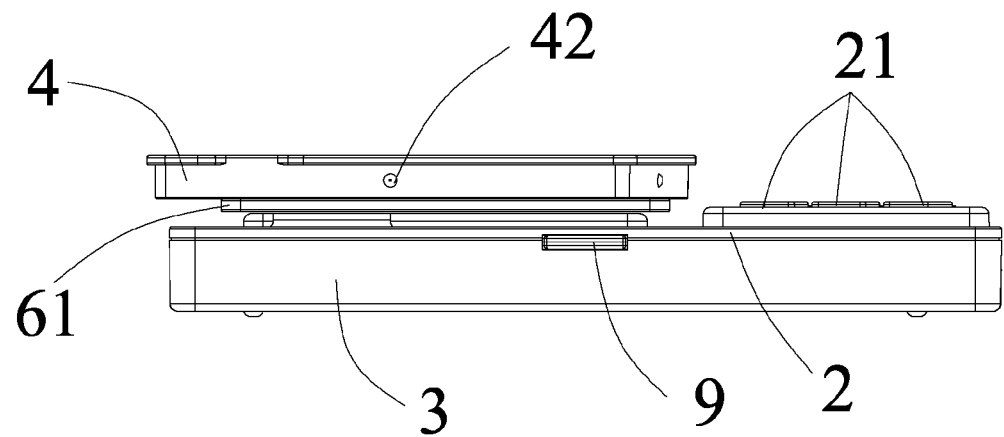
FIG. 7 is a front view of a scale according to an embodiment of the present invention, where an upper cover of the scale is open and a protective cover is placed right above a scale pan assembly.
Figure 8:
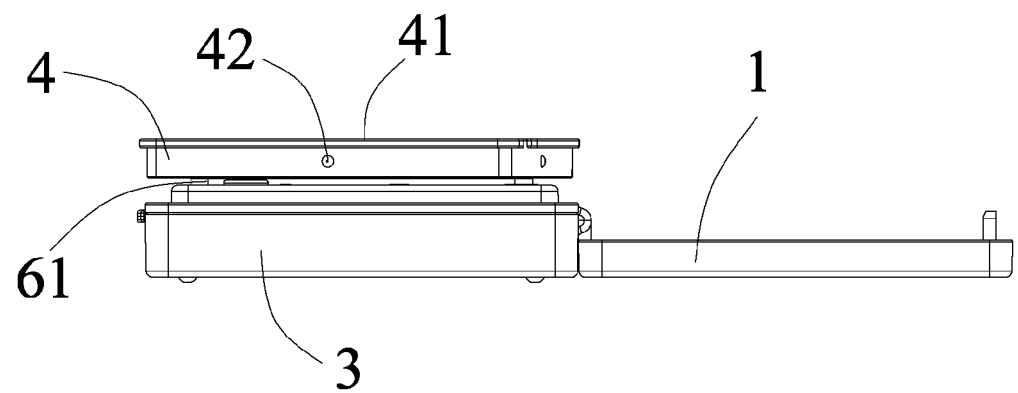
FIG. 8 is a right view of FIG. 7.

Further, in an exemplary embodiment provided in the present invention, as shown in FIG. 5 and FIG. 6, for ease of arranging the protective cover 4 on the top of the upper cover 1, multiple raised bars 12 are disposed on the interior side of the upper cover, where the raised bars 12 are arranged around the mounting hole 11, multiple flanks 41 are disposed outwards from edges of side walls of the protective cover 4 that are away from the top of the protective cover, and preferably, the flanks 41 extend outwards from the edges of the side walls that are away from the top of the protective cover. When there is no need to remove the protective cover 4 from the upper cover 1, flanks 41 abut against the top of the corresponding raised bars 12. It can be understood that the flanks 41 are exactly corresponding to the raised bars 12 and the raised bars 12 are arranged evenly around the mounting hole 11.

Further, in an exemplary embodiment provided in the present invention, as shown in FIG. 5 and FIG. 6, for ease of arranging the protective cover 4 on the top of the upper cover 1, a fastening hole 121 is arranged on each of the raised bars 12, multiple bulges 42 are disposed on an exterior side of the side walls of the protective cover 4, and the bulges 42 are fastened into the fastening holes 121. It can be understood that the fastening holes 121 are in a one-to-one correspondence with the bulges 42. It should be noted that when the protective cover 4 is removed from the upper cover 1, because each bulge 42 is merely a small bulge 42, a user can remove the protective cover 4 with a moderate force.

Further, in an exemplary embodiment provided in the present invention, as shown in FIG. 1 and FIG. 5 to FIG. 7, to make an internal structure, wiring installation and the like of the scale more orderly, the scale further includes a middle cover 2, the middle cover 2 is disposed in the cavity formed by the upper cover 1 and the lower cover 3, and actually, the middle cover 2 is buckled on the lower cover 3. For ease of weighing an object, the scale pan assembly 61 is located above the middle cover 2, and a control panel 51 of the display apparatus 5 is disposed on the middle cover 2, so that it is convenient to control the display apparatus 5 after the upper cover 1 is open.

Further, for ease of displaying the usability of the scale clearer, or for ease of using the scale, as shown in FIG. 1 and FIG. 5 to FIG. 7, multiple buttons 21 are disposed on and protrude from the middle cover 2, and the buttons 21 are connected to the weight sensor 62 by using the control apparatus 7. It can be understood that the buttons 21 are connected to a PCB board 71 of the control apparatus 7 and the weight sensor 62 is electrically connected to the PCB board 71. It should be noted that, as shown in FIG. 5 and FIG. 6, the buttons 21 separately pass through corresponding button 21 holes that are arranged on the control panel 51 and protrude from the middle cover 2, so that it is convenient for a user to perform a control operation. Preferably, the scale has three buttons 21, namely an ON/OFF button 21 that controls whether to weigh an object, a MODEL button 21 for switching weighing modes, and a reset-to-zero button 21. Certainly, different control buttons 21 may be arranged according to different user groups.

It should be noted that, as shown in FIG. 1, the display apparatus 5 further includes a display panel 52 that displays weight data, and a backlight element (not shown in the figure) is further arranged below the display panel 52, where the backlight element (not shown in the figure) and the display panel 52 are also connected to the PCB board 71. In addition, to protect the display panel 52 from abrasion, a protective housing 53 is further disposed on the display panel 52. In addition, as shown in FIG. 1, the weight sensor 62 and the PCB board 71 are both installed on the lower cover 3.

Further, for ease of improving balance quality of the scale to obtain an more precise weighing result, as shown in FIG. 1, the scale pan assembly 61 includes a first scale pan 611 and a second scale pan 612, the second scale pan 612 mutually fits the first scale pan 611 to protect the first scale pan 611, and the first scale pan 611 is in contact with the weight sensor 62. It can be understood that the first scale pan 611 fit the second scale pan 612 to form the scale pan assembly 61 to hold a weighed object. Preferably, the first scale pan 611 is made of a hardware material and the second scale pan 612 is made of a glass material.

Further, to improve usability and portability of the scale, as shown in FIG. 1 and FIG. 4, the upper cover 1 and the lower cover 3 are movably connected using a pin 8, that is, the pin 8 is used on a side wall of the upper cover 1 and the lower cover 3 to connect the two covers. Actually, a connector such as a hinge may also be used to movably connect the upper cover 1 to the lower cover 3.

Further, to prevent the upper cover 1 from releasing from the lower cover 3 and automatically opening when not in use or in a carrying process, as shown in FIG. 1, FIG. 2, and FIG. 5 to FIG. 7, a self-locking switch 9 is used between the upper cover 1 and the lower cover 3 for lock-up. It should be noted that the self-locking switch 9 is disposed on an opposite side of one side on which the upper cover 1 and the lower cover 3 are movably connected, that is, if the upper cover 1 and the lower cover 3 are movably connected on a rear side, the self-locking switch 9 is disposed on a front side of the upper cover 1 and the lower cover 3.

Further, for ease of viewing, the protective cover 4 is made of a transparent material. In addition, generally the upper cover 1 and the lower cover 3 are made of a plastic material. As seen from an overall appearance, the scale is like a smooth and flat card that is elegant in appearance. Therefore, this type of scale may also be called "card-type scale".

It should be noted that, to make it more convenient to carry the scale for outdoor use, as shown in FIG. 1 and FIG. 3, a battery 32 mounting slot (not shown in the figures) is disposed on the bottom of the lower cover 3. Two AAA 1.5V batteries 32 can be installed inside the mounting slot at the same time. Certainly, the mounting slot is further equipped with a battery 32 cover 31. Apparently, the scale has complete functions and an elegant appearance, is easy to operate, convenient to use, and durable in use, and is mainly used for weighing a 0.4 g to 1000 g object.

The foregoing descriptions are merely exemplary embodiments of the present invention, but are not intended to limit the present invention. For a person skilled in the art, there may be various modifications and changes for the present invention. Any modification, equivalent replacement, or improvement made without departing from the spirit and principle of the present invention shall fall within the protection scope of claims of the present invention.

What is claimed is:

1. A scale, comprising a display apparatus, a weighing apparatus which comprises a scale pan assembly and a weight sensor, and a control apparatus that connects to the weighing apparatus and is used to control the display apparatus to display weight data corresponding to an object; further comprising an upper cover and a lower cover, wherein
the upper cover is buckled on the lower cover and movably connected to the lower cover; the display apparatus, the weighing apparatus, and the control apparatus are all disposed in a cavity formed by the upper cover and the lower cover;
a mounting hole is arranged on a top of the upper cover; a protective cover, which is provided with side walls all around a periphery of a top thereof to form a concave structure with an opening end, is placed inside the mounting hole; a shape of the top of the protective cover matches with a shape of the mounting hole;
the protective cover is detachably connected to an interior side of the top of the upper cover; and
multiple raised bars are disposed on the interior side of the top of the upper cover, where the raised bars are arranged around the mounting hole, multiple flanks are disposed outwards from edges of side walls of the protective cover that are away from the top of the protective cover, and the multiple flanks abut against the top of the corresponding raised bars.

2. The scale according to claim 1, wherein: a fastening hole is arranged on each of the raised bars, multiple bulges are disposed on an exterior side of the side walls of the protective cover, and the bulges are fastened into the fastening holes.

3. The scale according to claim 1, wherein: the scale further comprises a middle cover, the middle cover is disposed in the cavity formed by the upper cover and the lower cover, the scale pan assembly is located above the middle cover, and a control panel of the display apparatus is disposed on the middle cover.

4. The scale according to claim 3, wherein: multiple buttons are disposed on and protrude from the middle cover and the buttons are connected to the weight sensor by using the control apparatus.

5. The scale according to claim 4, wherein: the scale pan assembly comprises a first scale pan and a second scale pan, the second scale pan mutually fits the first scale pan to protect the first scale pan, and the first scale pan is in contact with the weight sensor.

6. The scale according to claim 1, wherein: the upper cover and the lower cover are movably connected using a pin.

7. The scale according to claim 6, wherein: the upper cover and the lower cover are locked up by using a self-locking switch.

8. The scale according to claim 1, wherein: the protective cover is made of a transparent material.

9. The scale according to claim 1, wherein: a top of the protective cover is exactly flush with the top of the upper cover when the protective cover is assembled within the mounting hole of the upper cover.

10. The scale according to claim 1, wherein: after the upper cover is open, the upper cover is still connected to the lower cover.

11. The scale according to claim 10, wherein: the upper cover and the lower cover are movably connected using a hinge.

12. The scale according to claim 1, wherein: when the protective cover is disposed on the interior side of the top of the upper cover, the protective cover is buckled on the scale pan assembly to protect the scale pan.

13. The scale according to claim 12, wherein the protective cover is usable as a scale pan with its opening end facing upward, after removal off the upper cover.

14. A protective cover in combination with a scale, the protective cover comprising:
a top and side walls all around a periphery of the top thereof to form a concave structure with an opening end; and
multiple flanks disposed outwards from edges of the side walls of the protective cover that are away from the top of the protective cover;
wherein the scale comprises: a display apparatus, a weighing apparatus which comprises a scale pan assembly and a weight sensor, a control apparatus, an upper cover which comprises a mounting hole at a top thereof and multiple raised bars disposed on an interior side of the top thereof, and a lower cover; wherein the control apparatus connects the weighing apparatus and is used to control the display apparatus to display weight data corresponding to an object; and wherein the upper cover is buckled on the lower cover and movably connected to the lower cover; the display apparatus, the weighing apparatus, and the control apparatus are all disposed in a cavity formed by the upper cover and the lower cover; the raised bars are arranged around the mounting hole;
wherein a shape of the top of the protective cover matches with a shape of the mounting hole at the top of the upper cover to place the protective cover inside the mounting hole and allow the top of protective cover to be flush with the top of the top of the upper cover; the protective cover is detachably connected to the interior side of the top of the upper cover; and
wherein the multiple flanks of the protective cover abut against the top of the corresponding raised bars on the upper cover.

15. A protective cover for a scale, the protective cover comprising:
a top and side walls all around a periphery of the top thereof to form a concave structure with an opening end; and
multiple flanks disposed outwards from edges of the side walls of the protective cover that are away from the top of the protective cover;
wherein the scale comprises: a display apparatus, a weighing apparatus which comprises a scale pan assembly and a weight sensor, a control apparatus, an upper cover which comprises a mounting hole at a top thereof and multiple raised bars disposed on an interior side of the top thereof, and a lower cover; wherein the control apparatus connects the weighing apparatus and is used to control the display apparatus to display weight data corresponding to an object; and wherein the upper cover is buckled on the lower cover and movably connected to the lower cover; the display apparatus, the weighing apparatus, and the control apparatus are all disposed in a cavity formed by the upper cover and the lower cover; the raised bars are arranged around the mounting hole;
wherein a shape of the top of the protective cover matches with a shape of the mounting hole at the top of the upper cover to place the protective cover inside the mounting hole and allow the top of protective cover to be flush with the top of the top of the upper cover; the protective cover is detachably connected to the interior side of the top of the upper cover;
wherein the multiple flanks of the protective cover abut against the top of the corresponding raised bars on the upper cover; and
wherein a fastening hole is arranged on each of the raised bars, multiple bulges are disposed on an exterior side of the side walls of the protective cover, and the bulges are fastened into the fastening holes.

16. The protective cover according to claim 15, wherein: when the protective cover is disposed on the interior side of the top of the upper cover, the protective cover is buckled on the scale pan assembly to protect the scale pan.

17. The protective cover according to claim 16, wherein the protective cover is usable as a scale pan with its opening end facing upward, after removal off the upper cover.

* * * * *